R. W. NIVER.
LEER FEEDER.
APPLICATION FILED FEB. 3, 1922.

1,427,164.

Patented Aug. 29, 1922.
4 SHEETS—SHEET 1.

Inventor:
R. W. Niver,

Att'ys.

R. W. NIVER.
LEER FEEDER.
APPLICATION FILED FEB. 3, 1922.
1,427,164.
Patented Aug. 29, 1922.
4 SHEETS—SHEET 2.
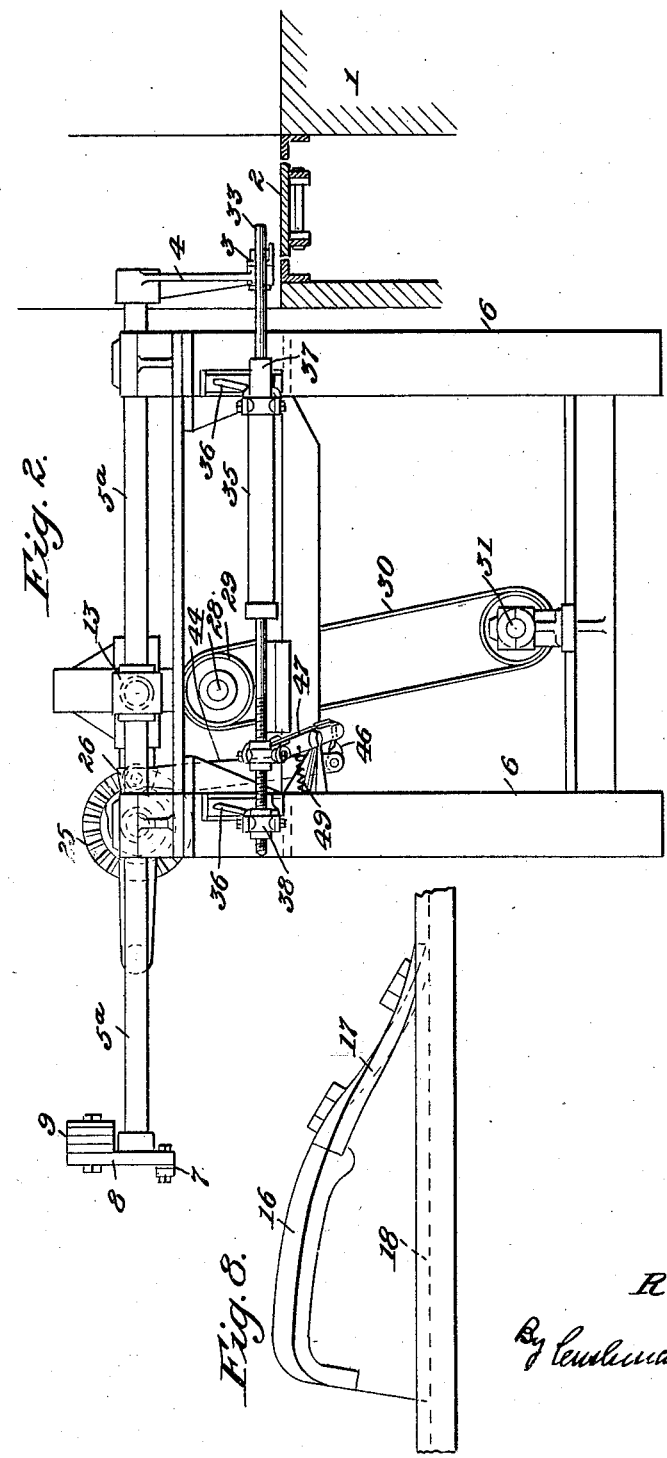
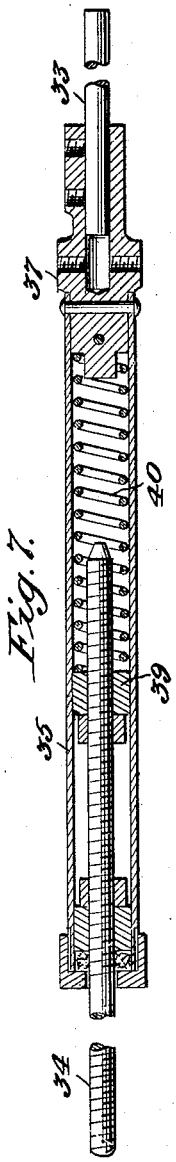
Inventor:
R. W. Niver.

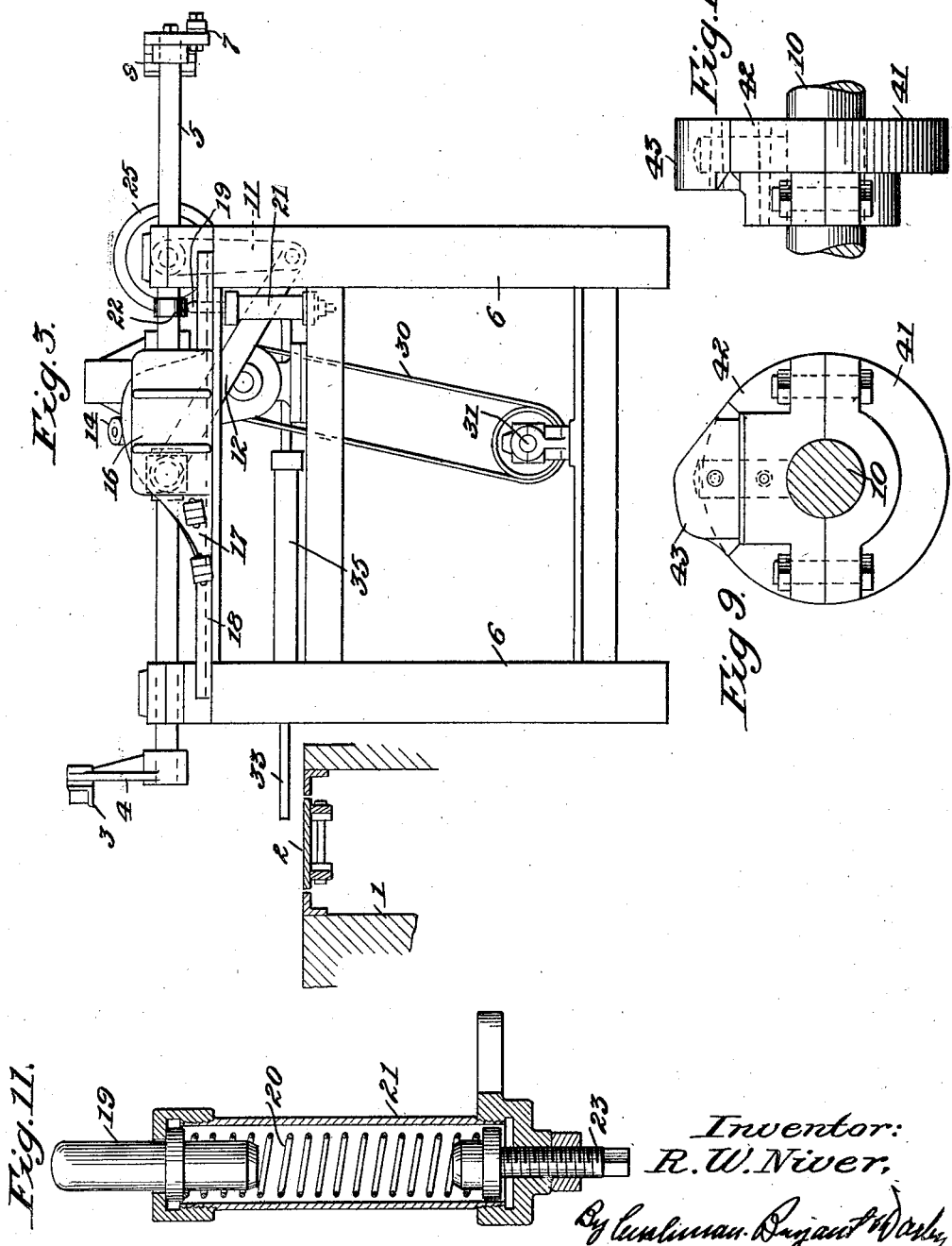

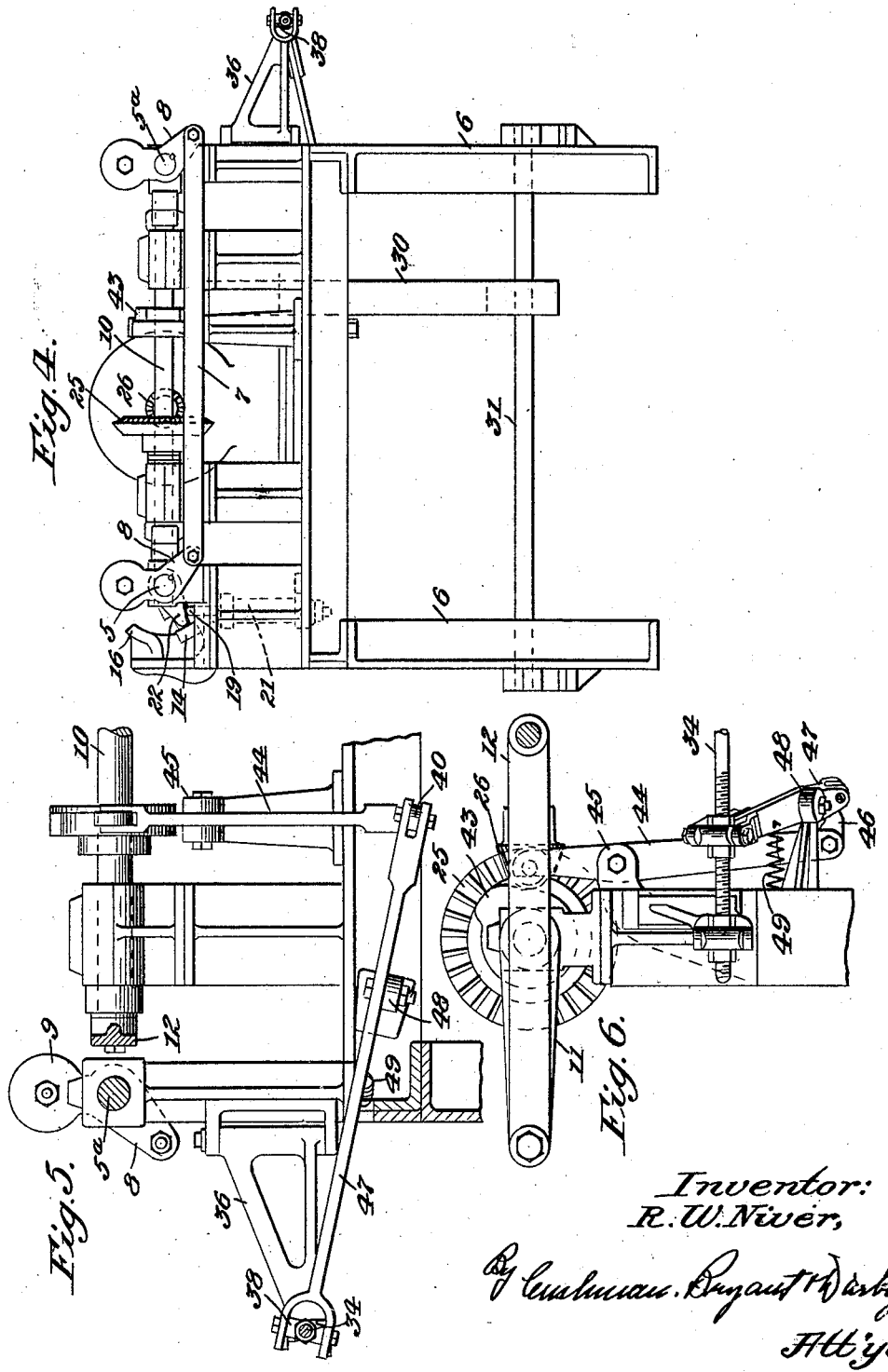

UNITED STATES PATENT OFFICE.

RAYMOND W. NIVER, OF ELMIRA, NEW YORK, ASSIGNOR TO THATCHER MANUFACTURING COMPANY, OF ELMIRA, NEW YORK, A CORPORATION OF NEW YORK.

LEER FEEDER.

1,427,164.  Specification of Letters Patent.  Patented Aug. 29, 1922.

Application filed February 3, 1922. Serial No. 533,792.

*To all whom it may concern:*

Be it known that I, RAYMOND W. NIVER, a citizen of the United States, residing at Elmira, in the county of Chemung and State of New York, have invented new and useful Improvements in Leer Feeders, of which the following is a specification.

The present invention relates to improvements in leer feeders and has for its primary object to provide an apparatus which may be readily associated with glass leers of standard construction by means of which freshly produced glass articles may be automatically charged into the leer more expeditiously than has been possible with the constructions heretofore provided for that purpose.

More particularly the present invention is designed for supplying bottles or articles of considerable height to a leer. With the feeding devices heretofore employed for this particular purpose it has been necessary to intermittently interrupt the movement of the supply conveyor, by which the articles are carried from the producing means, for example, to the mouth of the leer so that there would be no accumulation of such articles on said conveyor in the path of the push bar during its reciprocation. By the present invention it is possible to continuously actuate such conveyor while the push bar is reciprocating, means being provided whereby said bar is caused to move across the conveyor at a plane sufficiently high to pass over articles positioned in its normal path, on its return stroke.

Therefore, apparatus constructed in accordance with the present invention is adapted to supply articles to the leer more expeditiously than has been possible with the devices heretofore employed, and a further feature of the invention is that it enables the articles to be positively pushed into the leer and onto the feeding devices thereof to a greater distance than has been customary. This insures that all of the articles will be properly positioned on the traveling leer conveyor to be carried thereby through the heating chambers and there will be no danger of such articles accumulating in the mouth or entrance passage of the leer.

In the accompanying drawings:—

Fig. 2 is a side elevation with the parts in the position shown in Figure 1.

Fig. 3 is an elevation of the other side of the apparatus with the parts in the position occupied when the push bar has nearly completed its return movement.

Fig. 4 is a rear end elevation.

Fig. 5 is a sectional view substantially on the line 5—5 of Figure 1.

Fig. 6 is a detail elevation, on an enlarged scale.

Fig. 7 is a detail section, on an enlarged scale, of a portion of the means for temporarily preventing movement of the articles into the path of the pusher bar.

Fig. 8 is a detail of the cam by which vertical movement is imparted to the pusher bar.

Figs. 9 and 10 are, respectively, an elevation and end view of the cam controlling movement of the article arresting means.

Fig. 11 is a detail sectional view of a device for cushioning the downward movement of the pusher bar at the completion of its outward stroke.

Figure 1:
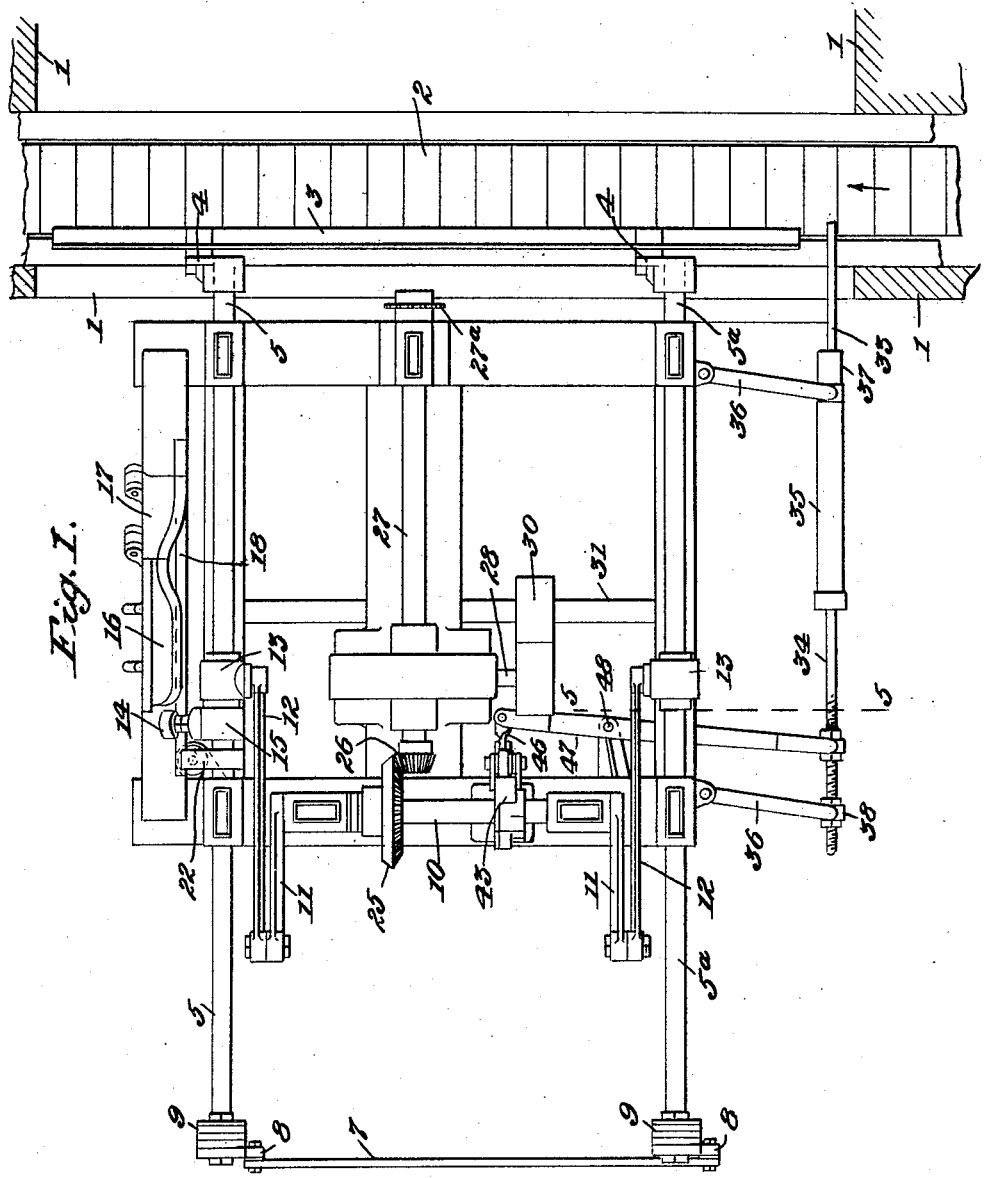
Fig. 1 is a plan of a leer feeder constructed in accordance with the present invention.

In the drawings many of the parts are shown more or less conventionally, and it is to be understood that the invention is not intended to be limited to the specific details of the embodiment thereof illustrated, except as such details are specifically recited in the claims hereinafter presented.

Referring to the drawings, 1 represents the side walls of the entrance passage to a glass leer and 2 the conveyor employed for transporting the articles from the producing means, or other suitable point, to a position to be introduced by the means hereinafter described into said leer passage. As the subject matter of the present invention is adapted for use with leers of various forms and supply conveyors of various forms, these parts are only shown conventionally, but it will be understood that, as usual, there is provided within the leer some form of endless conveyor mechanism onto which articles are transferred from the conveyor 2 by a pusher bar 3.

As shown, the supply conveyor 2 extends through openings formed in the side walls 1 of the leer passage and is continuously driven by any suitable means. The pusher bar 3 extends lengthwise of the conveyor 2 and is of such length that it is adapted to freely enter and move longitudinally of the entrance passage to the leer so that as it is reciprocated in one direction it will act to transfer articles positioned on the conveyor 2 in alignment therewith into the leer and in position to be engaged by the conveying means therein.

In the embodiment of the invention illustrated, the pusher bar 3 is formed of a suitable length of angle iron which is supported by arms 4 secured to a pair of parallel rods 5, 5$^a$ that are mounted in bearings supported on a frame including legs or uprights 6 that are connected by suitable cross bars or braces so as to provide a relatively light but strong frame of substantially rectangular form.

The rods 5, 5$^a$ are adapted to reciprocate and rock in their bearings on the main supporting frame and the rear ends thereof are connected by a link bar 7 which is attached to arms 8 that are secured to said rods 5, 5$^a$. The arms 8 extend above and below the rods 5, 5$^a$, and to the upwardly extending portions of such arms are detachably connected a suitable number of counterweight discs 9 so that a minimum amount of power is required to rock said rods in their bearings and effect vertical movement of the pusher bar 3, as will be hereinafter more particularly described.

The connected rods 5, 5$^a$, and the pusher bar 3 are reciprocated by connections with a power shaft 10 that is mounted in bearings on the main supporting frame. This shaft is provided at each end with a crank arm 11 that is connected by a link 12 with a collar or sleeve 13 suitably secured to the rods 5, 5$^a$, and, therefore, as the shaft 10 rotates, said rods and the pusher bar at the forward end thereof will be reciprocated and said bar caused to travel transversely across the conveyor into and longitudinally of the entrance passage to the leer.

When the reciprocating pusher bar is at the rear or outward end of its reciprocating stroke the parts are so positioned that the arms 4 extend downward from the rods 5, 5$^a$, and the pusher bar is, as shown in Figure 2, closely adjacent the surface of the supply conveyor 2. As the shaft 10 rotates, the rods 5, 5$^a$, and pusher bar 3, supported thereby, will be moved transversely across the conveyor 2 into the leer entrance passage and said pusher bar will act to transfer any articles that have been positioned in the path thereof by the conveyor 2 into the leer.

Means are provided whereby during the outward or return reciprocation of the pusher bar it will be automatically raised so that during the period when it is traversing the conveyor 2 on such outward stroke said bar will be relatively positioned as shown in Fig. 3, that is at a considerable elevation above the path in which it moved over said conveyor on its inward or forward stroke, such elevation being sufficient to enable the bar to clear or freely pass over any articles that have been positioned by the conveyor 2 in alignment with the leer passage during the time that the pusher bar was moving within said passage. Various means may be provided for accomplishing this purpose, but in the embodiment of the invention illustrated, such vertical movement of the pusher bar is effected by a cam supported by the main frame, with which cooperates a roller 14 carried at the outer end of an arm 15 that is secured to and extends radially from the supporting rod 5. The cam with which said roller 14 cooperates includes a relatively stationary member 16 and a hinged or vertically swinging section 17. The swinging section 17 of the cam is positioned at the forward end thereof and its extreme forward end is so shaped as to form a substantial continuation of the forward end of the relatively horizontal track 18 over which the roller 14 moves during the operative stroke of the pusher bar. During this operative stroke of the pusher bar as the roller 14 passes beneath the cam section 17 the latter is caused to swing about its pivotal connection with the frame so that it offers no obstruction to forward movement of the rods 5, 5$^a$, and pusher bar. As soon as the roller 14 passes from beneath the cam section 17 the latter is returned to its normal position. Therefore, during the return or outward stroke of the rods 5, 5$^a$, and pusher bar 3, the roller 14 will necessarily ride up along the cam 17, 16, and thus effect a rocking of the rods 5, 5$^a$, and consequent turning of the arms 4 and elevation of the pusher bar 3 from the position shown in Fig. 2 to that show in Figure 3.

The parts are so positioned that the pusher bar will be at its maximum elevation during that portion of its return stroke where it traverses the conveyor 2 and as said bar passes from over the conveyor the roller 14 will pass from the rear end of the cam 16 and the rods 5, 5$^a$, will be automatically rocked to lower the pusher bar to the position shown in Fig. 2.

Means are provided whereby this rocking of the rods 5, 5$^a$, effecting lowering of the pusher bar, and consequent falling of the arm 15 and roller 14 will be cushioned and prevened from unnecessarily jarring or damaging any of the parts. As shown, this means includes a cushion stop 19, which is supported by a spring 20 arranged within a casing 21 that is suitably attached to the main frame, said stop 19 being in the path of an arm 22 that extends radially from the rod 5 in substantial parallelism to the arm 15. The parts are so proportioned and related that the arm 22 will come into contact with the cushion member 19 just prior to the roller 14 striking the horizontal track section 18 as it falls from the rear end of the cam member 16. By means of a screw 23 extending into the casing 21 and accessible from the underside of the top of the main supporting frame, the cushioning effect of the spring 20 may be varied and controlled as desired.

The shaft 10 is shown as provided with a bevel gear 25 with which meshes a pinion 26 on a shaft 27 mounted in suitable bearings on the main frame and this shaft is rotated by suitable worm gearing connecting it with a shaft 28 on which is mounted a pulley 29 that is connected by a belt 30 with a pulley on a countershaft 31 supported near the bottom of the main supporting frame and adapted to be rotated by any suitable driving means. The shaft 27 extends forwardly from the main supporting frame and may be provided with a sprocket 27ª that, if desired, can be connected with the driving means of the supply conveyor 2 so that all of the moving parts may be driven from the single countershaft 31.

From the foregoing description it will be seen that the conveyor 2 can be operated to continuously carry articles into position to be introduced into the leer and that the pusher bar is so actuated that it will not, on its return stroke, contact with such articles as may have been positioned in alignment with the leer passage during the inward stroke or movement of said bar.

To prevent any possibilty of the pusher bar 3 striking an article on the conveyor 2, but partially at one side of the path of the pusher bar, means are provided whereby the movement of the next article of the series on the conveyor 2 toward the leer passage will be temporarily arrested.

As shown, this means includes a restraining rod comprising two sections 33, 34, connected by an intermediate tubular member 35. Said members are supported at one side of the main frame by bracket arms 36 adapted to swing about parallel vertical axes, and means are provided whereby said brackets are automatically turned about their axes to project the member 33 across the conveyor 2 as the pusher bar begins its forward or inward reciprocation, such means being rendered inoperative and the member 33 withdrawn from operative position as the pusher bar passes from over the conveyor.

As shown, the member 33 is suitably secured in a plug or closure for the forward end of the tubular member 35 and the forward bracket 36 is connected to said plug at 37. The member 34 is provided with a suitable thread and has its forward end extending into the casing 35. The rear swinging bracket 36 is pivotally connected to a collar 38 secured to the member 34 near its rear end and on the last said member within the casing 35 is arranged a piston-like block 39. A spring 40 is positioned between the block 39 and the plug closing the forward end of the casing 35, which will act to permit relative movement between the casing and member 34 in event that the member 33 during its forward movement strikes an article on the conveyor 2. It will be understood that the spring 40 is compressed to such an extent that except the member 33 contact with an article on the conveyor it will simply transmit movement of the member 34 to the member 33 and position the latter in the path of articles on the conveyor moving toward the path of the pusher bar 3. If, however, the member 33 should strike an article as it is being projected the spring 40 will be further compressed causing relative movement between the members 33, 34, and permitting the articles to pass from the path of the stop member 33, said member 33 being instantly projected by the spring 40 as soon as said article has passed from engagement therewith.

Reciprocation of the members 33, 34, is effected by a cam mounted on the shaft 10 and suitable levers interposed between said cam and the member 34. The cam is formed of two main sections 41, 42, which are bolted together about the shaft 10 and a cam block 43 secured to the member 42. This member 43 is detachably connected with the body of the cam disc so that it may be readily replaced, if, after considerable use, it becomes worn. As the shaft 10 rotates the cam block 43 thereon contacts with a roller mounted at the upper end of a substantially vertical lever 44 which is fulcrumed on an ear 45 on the main frame and has its lower end connected by a link 46 to a substantially horizontal lever 47 fulcrumed at 48 on an arm of the main frame and having its outer end adjustably connected with the member 34 on the article arresting means. A spring 49 acts to move the lever 47 in opposition to the cam and the parts are so positioned that the cam will only hold the member 33 in operative position across the conveyor 2 during the time that the pusher bar 3 is moving thereover during its inward or operative stroke. As the pusher bar 3 passes from above the conveyor 2 into the leer, the cam 43 will leave the lever 44 and the members, 34, 35, 33 will, by the spring 49, be instantly returned to their normal inoperative position. Therefore, there will be but a very slight checking of the movement of the first of the series of articles approaching the leer passage on the conveyor 2, if any, and said conveyor can operate continuously. In practice the articles are necessarily spaced apart somewhat on the conveyor and the parts of the present apparatus are so designed that during the time the conveyor is moving the distance separating adjacent articles thereon the arresting member 33 will be moved into and from operative position so as not to interfere in any manner with the proper supply of articles to position to be transferred into the leer by the reciprocating pusher bar.

In the drawings and in the foregoing description it has been assumed that the supply conveyor 2 is moving in the direction of the arrow in Figure 1, and, therefore, the arresting member 33 and its actuating lever are shown at the right hand side of the apparatus, looking toward the leer, and the cam 16, 17, and cooperating parts at the left hand side. It will be appreciated, however, that the relative positions of these parts may be reversed in case it is desired to employ the invention in connection with a supply conveyor moving in the opposite direction.

It is thought that the operation and advantages of the invention will be readily understood and appreciated from the foregoing description and the drawings therein referred to.

It will be seen that it provides means whereby articles may be continuously advanced by the supply conveyor to position to be introduced into the leer, such movement of articles occurring during the period that the pusher bar is reciprocating as well as between movements thereof so that a maximum number of articles may be properly transferred from said conveyor to the leer within a given time.

An important feature of the invention is the fact that it provides means whereby a feeding stroke of maximum length may be imparted to the pusher bar and the articles thus carried sufficiently far into the leer passage to insure their being properly engaged by the conveying devices therein and also pushed into the tempering zone of the leer quickly. With apparatus where the supply conveyor can only operate to position articles in the path of the pusher bar during the interval that said bar is at rest at the end of its rearward or outward stroke, the length of stroke permitted such pusher bar must necessarily be limited, and, therefore, it is possible that all of the articles pushed from the conveyor 2 will not be properly engaged with the conveying devices within the leer.

By providing means whereby the pusher bar is moved vertically during its rearward or outward movement so that articles can be continuously moved into the path thereof, it will be evident that a longer reciprocation of the pusher bar is possible and said bar will be carried inward along the feed passage of the leer to such an extent as to insure proper engagement of all of the articles in advance thereof with the leer conveying means.

Having thus described the invention, what is claimed is:—

1. A leer feeder comprising, in combination, a carrier adapted to transport articles transversely of the entrance passage of a leer, a reciprocatory transfer bar movable over the carrier, and means for automatically effecting vertical movement of the transfer bar during its travel away from the leer.

2. A leer feeder comprising, in combination, a continuously movable carrier, adapted to transport articles transversely of the entrance passage of a leer, a reciprocatory member adapted to push articles from the carrier into said leer passage when moving in one direction, and means for causing the reciprocatory member to travel in a plane above that of articles on the carrier when moving in the opposite direction.

3. A leer feeder comprising, in combination, a continuously movable carrier adapted to transport articles transversely of the entrance passage of a leer, a reciprocatory member adapted to push articles from the carrier into said leer passage when moving in one direction, and means for effecting relative vertical movement between the carrier and pusher when the latter is moving in the opposite direction, whereby it will travel above articles on the carrier.

4. A leer feeder comprising, in combination, a continuously movable carrier adapted to transport articles to the entrance passage of a leer, and means for intermittingly transferring articles from said carrier into said passage, said means moving across the carrier in the plane of articles thereon in a direction toward the leer and in a plane above articles on the carrier in the opposite direction.

5. A leer feeder comprising, in combination, a continuously movable carrier adapted to transport articles to the entrance passage of a leer, a reciprocating pusher movable transversely of the path of travel of the carrier and adapted to force articles therefrom and along said passage when moving in one direction, and means for preventing contact of said pusher with articles on the carrier during its movement thereover in the opposite direction.

6. A leer feeder comprising, in combination, a continuously movable carrier adapted to transport articles to the entrance passage of a leer, a pusher movable in opposite directions over the said carrier and adapted to force articles therefrom and along said passage when moving in one direction, and means for causing the pusher to travel over the carrier in a plane above the articles thereon in the opposite direction.

7. A leer feeder comprising, in combination, an endless carrier adapted to transport articles transversely of the entrance passage of a leer, a pusher bar extending longitudinally of the carrier and adapted to be reciprocated thereover into and from said passage, whereby articles on the carrier will be transferred therefrom into the leer, and means for causing the pusher bar to pass above articles on the carrier during its movement in a direction away from the leer.

8. A leer feeder comprising, in combination, a continuously movable carrier adapted to transport articles transversely of the entrance passage of a leer, means movable across the carrier and longitudinally of the leer passage to transfer articles from the carrier to the leer, means for preventing articles being positioned in alignment with the leer passage by the carrier while the article engaging member of the transfer means is moving across the carrier toward the leer, and means whereby said member of the transfer means is caused to move across the carrier in a direction away from the leer in a path that prevents contact of said member with articles on the carrier.

9. A leer feeder comprising, in combination, a continuously movable carrier adapted to transport articles transversely of the entrance passage of a leer, means for transferring articles from the carrier to the leer including a member movable over the carrier in the plane of articles thereon in a direction toward the leer and movable over the carrier in a plane above the articles thereon in the opposite direction, and means for preventing articles being positioned by the carrier in alignment with the leer passage while said transfer member is moving over the carrier toward the leer.

10. A leer feeder comprising, in combination, a continuously movable carrier adapted to transport articles transversely of the entrance passage of a leer, a reciprocating pusher bar extending lengthwise of the carrier and movable thereover and longitudinally of the leer passage, and means for moving said bar vertically during its travel outward from the leer, for the purpose described.

11. A leer feeder comprising, in combination, a continuously movable carrier adapted to transport articles transversely of the entrance passage of a leer, a reciprocating pusher bar extending lengthwise of the carrier and movable thereover and longitudinally of the leer passage, and means for moving said bar vertically during the portion of its travel outward from the leer that it is passing over the carrier, for the purpose described.

12. A leer feeder comprising, in combination with a continuously movable carrier adapted to transport articles transversely of the entrance passage of a leer, a pusher bar extending longitudinally of the carrier and supported to be parallel thereto at all times, means for reciprocating said bar over the carrier toward and from the leer, and means for causing the bar to move vertically during its travel away from the leer.

13. A leer feeder comprising, in combination with a continuously movable carrier adapted to transport articles transversely of the entrance passage of a leer, a pusher bar extending longitudinally of the carrier, two parallel rods supported at the side of the carrier away from the leer, links connecting said rods with the pusher bar, means for reciprocating the rods to move the pusher bar across the carrier and longitudinally of the leer passage, and a cam cooperating with one of said rods whereby the pusher bar will be moved vertically during its travel away from the leer.

14. A leer feeder comprising in combination with a continuously movable carrier adapted to transport articles transversely of the entrance passage of a leer, a pusher bar extending longitudinally of the carrier, reciprocating means connected with the bar and adapted to move it across the carrier toward and from the leer, and means including an arm connected with the reciprocating pusher bar and a cam cooperating with said arm whereby the bar will be moved vertically during its travel away from the leer.

15. In a leer feeder, means for transferring articles from a support in alignment with the entrance passage of a leer along said passage comprising a frame, two parallel rods mounted to reciprocate and rock in bearings on said frame, a pusher bar supported by said rods and adapted to travel longitudinally of the leer passage as the rods are reciprocated, means for reciprocating the rods, an arm extending radially from one of the rods, and a cam adapted to cooperate with said arm as the rod moves to carry the pusher bar away from the leer whereby the pusher bar will be moved vertically during such longitudinal movement.

16. In a leer feeder, means for transferring articles from a support in alignment with the entrance passage of a leer along said passage comprising a frame, a reciprocating pusher supported by means including a rod adapted to both reciprocate and rock in bearings on the frame, an arm extending radially from said rod, and a movable cam mounted on the frame in the path of said arm, whereby when the pusher bar is moving toward the leer the cam will be moved to inoperative position and during movement of the bar away from the leer said cam and arm will effect a rocking of said rod to move the pusher bar vertically.

17. In a leer feeder, means for transferring articles from a support in alignment with the entrance passage of a leer along said passage comprising a frame, a reciprocating pusher supported by means including a rod adapted to both reciprocate and rock in bearings on the frame, an arm extending radially from said rod, and a cam, pivotally supported to swing about a horizontal axis on the frame, in the path of said arm, whereby when the pusher bar is moving toward the leer said arm will travel beneath the cam and during movement of the bar in the opposite direction said arm will cooperate with the cam to effect vertical movement of the pusher bar.

18. In a leer feeder, means for transferring articles from a support in alignment with the entrance passage of a leer along said passage comprising a supporting frame, two parallel rods supported to reciprocate and rock in bearings on the frame, a pusher bar supported by the ends of said rods adjacent the leer, a counterweighted connection between the rods, adjacent the other ends thereof, means for reciprocating the rods, an arm extending radially from one of the rods, and a cam adapted to cooperate with said arm during movement of the rods and pusher bar away from the leer to rock the rod and effect a vertical movement of the pusher bar.

19. In a leer feeder, the combination of a continuously moving carrier adapted to transport articles transversely of the entrance passage of a leer, means movable transversely across the carrier toward and from the leer and adapted to transfer articles from the carrier and longitudinally of said passage when moving toward the leer, a stop preventing articles being positioned in the path of said transfer means while the latter is moving across the carrier toward the leer, said stop being automatically rendered inoperative as soon as the operative member of the transfer means has passed over the carrier toward the leer, and means for effecting vertical movement of the operative member of the transfer means during its movement away from the leer.

20. In a leer feeder, the combination of a continuously moving carrier adapted to transport articles transversely of the entrance passage of a leer, a reciprocating pusher movable across said carrier and adapted when moving toward the leer to transfer articles from the carrier and longitudinally of said passage, a stop adapted to prevent the positioning of articles on the carrier in the path of the pusher when the latter is moving over the carrier toward the leer, said stop being rendered inoperative as the pusher passes from above the carrier, and means for automatically moving the pusher vertically during the portion of its travel away from the leer that it is passing over the carrier.

21. In a leer feeder, the combination of a continuously moving carrier adapted to transport articles transversely of the entrance passage of a leer, means movable transversely of the carrier toward and from the leer and adapted to transfer articles from the carrier and longitudinally of the said passage when moving toward the leer, a stop adapted to prevent the positioning of articles on the carrier in the path of the transfer means, a cam for moving said stop to operative position as the article engaging member of the transfer means begins to move toward the leer, a spring acting to shift said stop to inoperative position as the article engaging member of the transfer means passes from the carrier toward the leer, and means for causing the article engaging member of the transfer means to travel over the carrier in its movement away from the leer at a height above articles in position thereon to be transferred to the leer when the said article engaging member again moves toward the leer.

22. In a leer feeder, the combination of a continuously moving carrier adapted to transport articles transversely of the entrance passage of a leer, means movable transversely across the carrier toward and from the leer and adapted to transfer articles from the carrier and longitudinally of said passage when moving toward the leer, a reciprocating stop movable across the carrier to prevent articles being positioned in the path of the transfer means as the latter is moving over the carrier toward the leer and movable to inoperative position as the operative member of the transfer means passes from over the carrier, and means whereby during its movement away from the leer the operative member of the transfer means is caused to pass over the carrier at a sufficient height to clear any articles that have been positioned thereon in the path of said transfer member when moving toward the leer.

23. In a leer feeder, the combination with a continuously moving carrier adapted to transport articles transversely of the entrance passage of a leer, a pusher bar extending longitudinally of the carrier, parallel rods connected to said bar and mounted for both rocking and reciprocating movement, a power shaft connected to said rods to reciprocate them and the pusher bar while permitting rocking movement of the rods, a stop adapted to prevent the positioning of articles on the carrier in the path of the pusher, a cam actuated by the power shaft adapted to adjust said stop to operative position at the beginning of the reciprocatory movement of the rods and pusher bar toward the leer, said stop being automatically returned to inoperative position as the transfer bar passes from over the carrier toward the leer, and means for rocking the pusher bar rods during their reciprocating movement away from the leer.

24. In a leer feeder, the combination with a carrier adapted to transport articles transversely of the entrance passage of a leer, a pusher bar extending longitudinally of the carrier, means supporting said bar including two rods adapted to reciprocate transversely of the carrier and to rock about their axes, an arm extending radially from one of said rods, a cam adapted to cooperate with said arm during a portion of the reciprocating movement of the pusher bar away from the leer, whereby the bar will be moved vertically, and a yielding stop adapted to be engaged by said arm as it passes from said cam and the pusher bar is permitted to fall to its original position.

25. A leer feeder comprising a pusher bar movable longitudinally of an entrance passage of a leer, two rods mounted to reciprocate and rock, arms extending radially from said rods and connected to the pusher bar, means for reciprocating the rods, an arm extending radially from one of the rods, a cam adapted to cooperate with said arm during a portion of the reciprocating movement of the pusher bar away from the leer, whereby said bar will be moved vertically, and a spring stop extending into the path of said arm as it leaves the cam to cushion the falling movement of the pusher bar.

In testimony whereof I have hereunto set my hand.

RAYMOND W. NIVER.